United States Patent [19]

Gravelle

[11] 3,975,065
[45] Aug. 17, 1976

[54] ADJUSTABLE BEARING ASSEMBLY
[75] Inventor: Homer E. Gravelle, Jefferson, Colo.
[73] Assignee: Sundstrand Corporation, Rockford, Ill.
[22] Filed: May 27, 1975
[21] Appl. No.: 580,947

[52] U.S. Cl. .............................................. 308/73
[51] Int. Cl.² ........................................ F16C 17/06
[58] Field of Search .................... 308/73, 121, 161

[56] References Cited
UNITED STATES PATENTS

| 640,397 | 1/1900 | Merker | 308/73 |
|---|---|---|---|
| 2,538,746 | 1/1951 | Dall | 308/73 |
| 3,497,276 | 2/1970 | McGrew, Jr. et al. | 308/73 |
| 3,572,856 | 3/1971 | McHugh | 308/73 |
| 3,804,472 | 4/1974 | Schuller et al. | 308/73 |
| 3,830,552 | 8/1974 | Schuller et al. | 308/73 |

Primary Examiner—M. H. Wood, Jr.
Assistant Examiner—Richard A. Bertsch
Attorney, Agent, or Firm—Wegner, Stellman, McCord, Wiles & Wood

[57] ABSTRACT

A fluid film journal bearing having a cartridge supported within a suitable bore in a machine housing by support surfaces in contact therewith is also provided with nonsupport surfaces spaced from the internal wall of the bore to provide axial access to ball pivot screws threadably connected to the cartridge. The ball pivot screws carry pivoted bearing pads that bear the journal. The pivoted bearing pads are carried at the end of the ball pivot screws within a central bearing cavity through the cartridge. The heads of the screws are located between the nonsupport surfaces and the internal wall of the bore so that they may be engaged by a wrench or other suitable tool to adjust the position of the associated pivoted bearing pad without removing the bearing assembly from the bore. The cartridge body is provided with slots extending through the screw holes which define two spaced flexible walls. A pair of tightening screws located on opposite sides of each ball pivot screw extend transversely through one of the walls and into threadable engagement with the other wall. After positional adjustment of the ball pivot screws, the tightening cap screws are tightened to squeeze the two walls together and thereby remove thread clearance between the ball pivot screws and their mating threaded holes. Means associated with the cartridge are provided for the circulation of cooled lubricating fluid within the bearing cavity.

21 Claims, 4 Drawing Figures

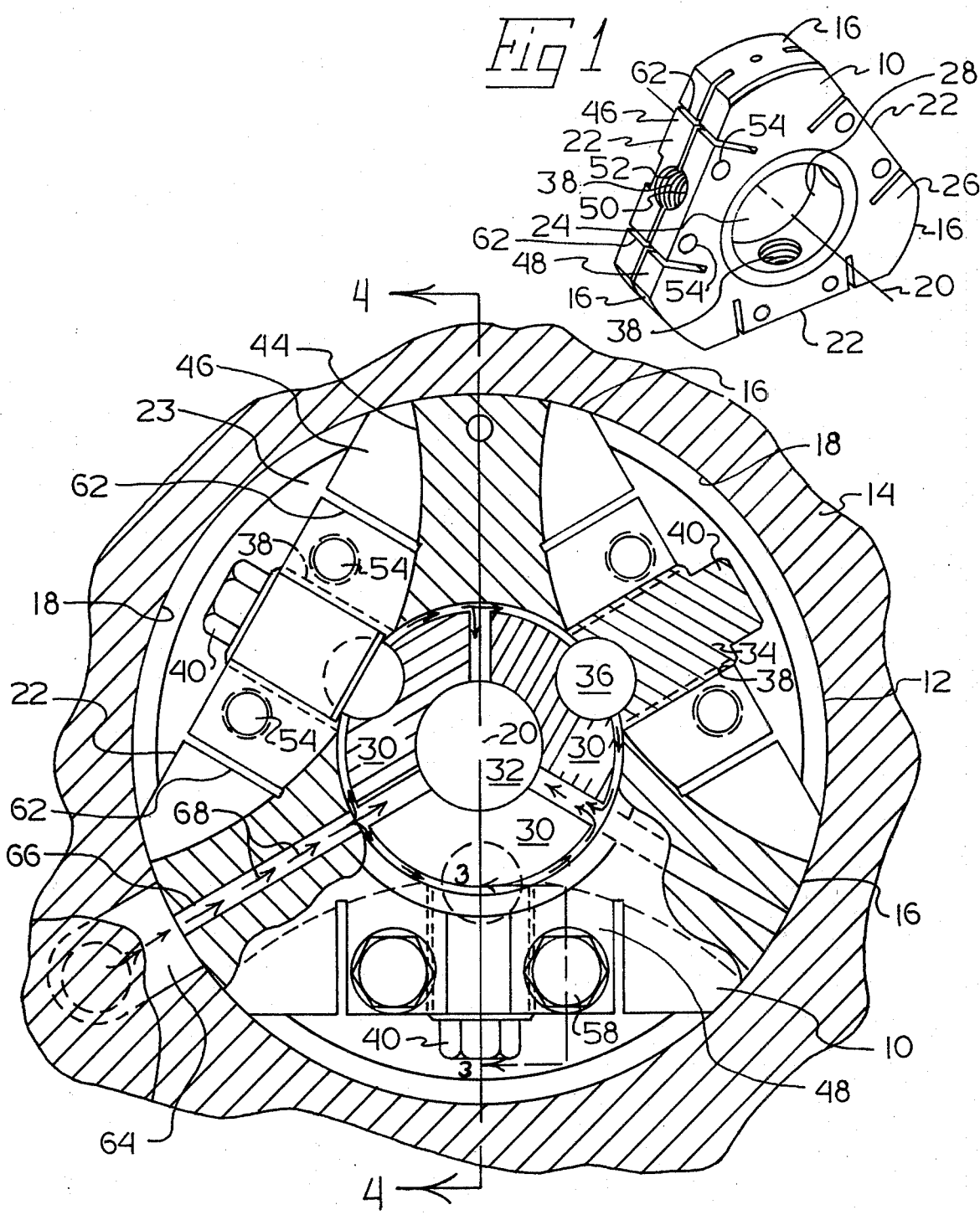

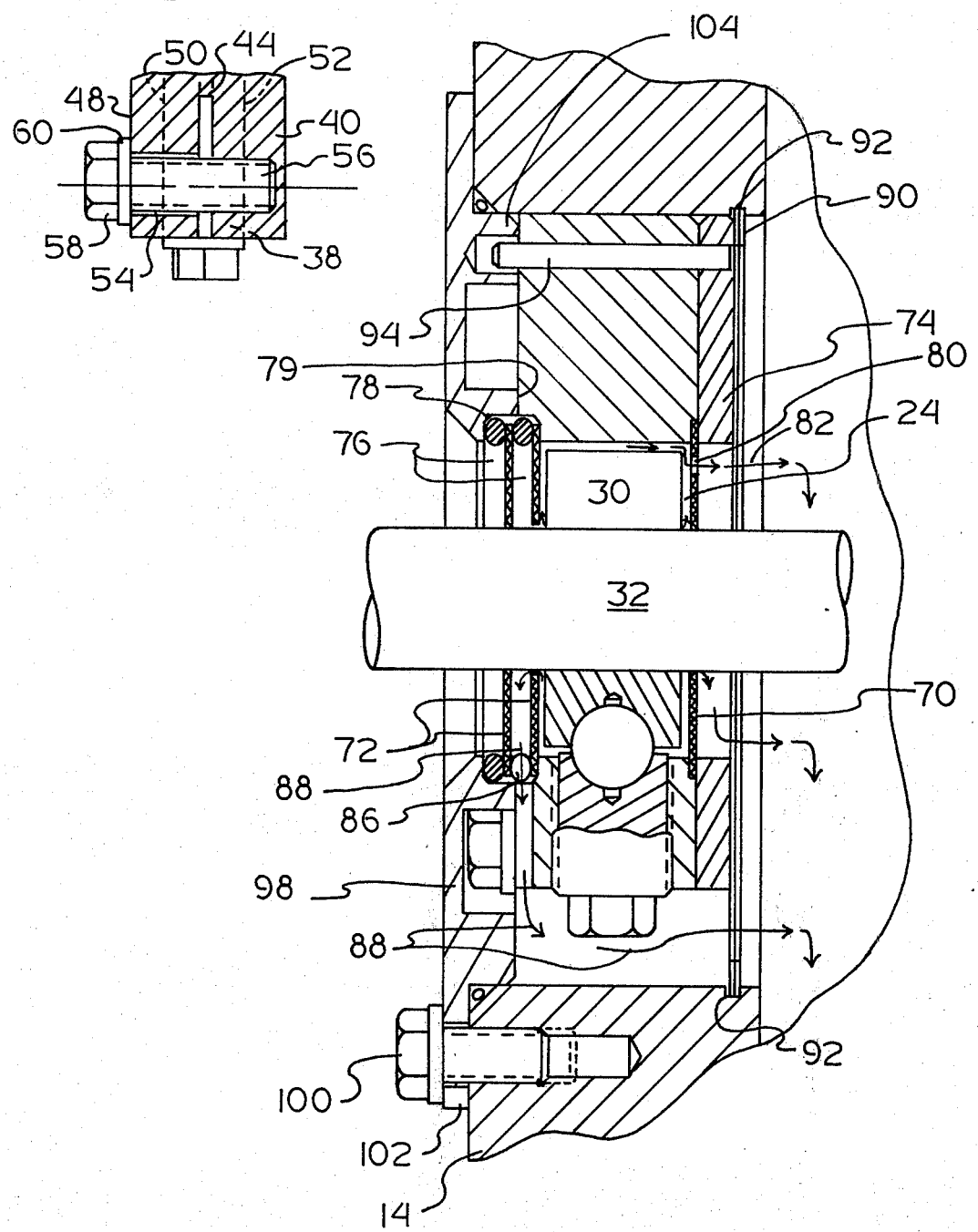

ADJUSTABLE BEARING ASSEMBLY

BACKGROUND OF THE INVENTION

This invention generally relates to adjustable connecting apparatus, and in particular to apparatus for fixedly adjusting the position of the bearing in a pivoted pad journal bearing.

Fluid film bearings are frequently required in rotating machines where speed and endurance requirements are beyond the capability of rolling contact bearings. Such machinery often requires bearing configurations which are highly stable and free from whip and whirl problems. Such bearing designs tend to be complicated and consequently expensive relative to other types of bearings.

One known type of fluid film bearing is a pivoted pad journal bearing, examples of which are shown in U.S. Pat. No. 3,572,856 of McHugh and in U.S. Pat. No. 3,497,276 of McGrew, Jr., et al. As discussed in the patent of McHugh, in order to achieve the requisite stability, it is essential to properly set the pivot circle clearance, i.e., the clearance between the pivoted bearing pad and the journal of the rotating shaft borne thereby. The amount of clearance even in rotating machinery of large dimensions must be kept on an order of a few mils. It is known to make such adjustment by means of threadably adjustable coupling arrangements. However, as noted by McHugh, precise adjustment is difficult due to the existence of a thread clearance between the threaded coupling members which permits backlash, i.e., relative lateral movement therebetween. A known approach to solve the backlash problem has been the use of spring members which act on the coupling members to press the threads together in a given axial direction.

Due to mechanical wear, etc., machines operating continuously often require routine maintenance adjustments of the pivot circle clearance. Ready access to the adjustment mechanism thus becomes very important in order to keep the time, and thus the expense, of routine maintenance to a minimum. One known technique for achieving easy accessibility has been to mount the bearing pads within a bearing housing or collar which is attached to and extends outwardly from a wall of the machine housing, or is otherwise supported in a location spaced therefrom. The adjustment mechanisms extend through the collar in a radial direction and have manually engageable parts located at the exterior of the collar and spaced from the machine housing.

While mounting the bearing assembly within a bore of the housing wall itself has advantages over the technique of mounting the bearing assembly within a collar separately attached to the machine, accessibility problems have detracted from the use of this mounting approach. The support to the bearing assembly provided by a bore contained within the wall of a machine housing is of equal or greater strength than that provided by an attached bearing assembly collar. Further, even when an attached collar is utilized, a bore must still be provided for passage of the shaft through the housing wall from the interior thereof so that it may be engaged by the bearing assembly exterior of the wall. Fabrication time is reduced by eliminating the need for attaching the bearing collar to the machine housing.

SUMMARY OF THE INVENTION

The principal object of this invention is the provision of an adjustable bearing assembly supportable within a cavity in the wall of a machine housing which has mechanisms accessible from without the machine housing so that desired adjustemnt thereto may be made without removing the bearing assembly from the cavity. Two adjustable mechanisms are provided, one for adjustably positioning the bearing, and the other for rigidly locking the one positioning adjusting mechanism into the position to which it has been adjusted. Both of these mchanisms are accessible through the cavity opening.

Accessibility to the positional adjustment mechanisms is achieved in the preferred embodiment of the insertable bearing assembly of the present invention by provision of a bearing cartridge insertable into the machine housing cavity or bore with a support surface is supportable contact with the internal wall thereof and a nonsupport surface spaced from said internal wall. A bearing member is adjustably secured to the cartridge by means accessible through the space between the nonsupport surface and the internal wall of the bore for manual adjustment thereof. Specifically, the positional adjustment mechanism is an elongate screw or the like extending through, and in threadable engagement with, a screw hole in the cartridge body. The screw extends from the nonsupport surface to a bearing cavity centrally located in the cartridge whereat a bearing member carried by one end of the screw is located. The screw has a head overlying the nonsupport surface and engageable by a wrench, or like tool, axially insertable into the open end of the bore from the outside of the housing.

Another object of the present invention is to reduce backlash between two threaded members of a coupling arrangement of the type used to adjustably couple together the securing member and the cartridge. This objective is achieved through provision of a locking mechanism for reducing the effective diameter of the screw hole and thereby reducing thread clearance between the screw and the screw hole after positional adjustment therebetween has been made. This adjustable locking mechanism is also accessible from without the bore. The cartridge body is provided with a slot that intersects the screw hole along its length. The slot defines two spaced walls and the screw hole is thereby defined by a pair of complementary internally threaded, sectional cylindrical grooves respectively located in he two spaced walls directly opposite one another. After the screws or other externally threaded member are screwed into the slotted screw holes, and positional adjustments made, manually operable tightening members engageable with both walls are utilized for fixedly reducing the spacing therebetween. At each location, the diameter of the screw hole is thereby decreased, and the thread clearance between the screw and the screw hole is reduced. In the preferred form of the invention, the tightening member is a cap screw extending through one end threadably engageable with the other of the pair of walls. The screws head overlies the outer wall for access thereto from the bore opening. By tightening the screw, the two walls are drawn together and the thread clearance is reduced.

The foregoing advantageous features of the insertable bearing assembly will be described in more detail, and further advantageous features will be made apparent in the following description of the preferred embodiment.

BRIEF DESCRIPTION OF THE DRAWING

The description of the preferred embodiment is given with reference to the drawing, in which:

FIG. 1 is a perspective view of the bearing cartridge forming a part of the preferred embodiment of the adjustable, insertable bearing assembly;

FIG. 2 is an axial view, partially in section, of the insertable bearing cartridge inserted in a bore of a machine housing;

FIG. 3 is a view of a section of a part of the insertable bearing assembly taken along section line 3—3 of FIG. 2; and FIG. 4 is a sectional view of the insertable bearing assembly taken along section line 4—4 of FIG. 2.

DESCRIPTION OF THE PREFERRED EMBODIMENT

Referring to FIGS. 1 and 2, the bearing assembly is seen to include a bearing cartridge insertable into a bore or cavity 12 in a wall of a machine housing 14. The cartridge 10 has three support surfaces 16 which are in supportable contact with the internal wall 18 of a bore 12 when inserted into the bore. Support surfaces 16 are cylindrical sections of a cylinder congruent with that defined by internal wall 18. The three support surfaces 16 are equally spaced around a center axis 20 of bearing cartridge 10 to provide equal distribution for supporting forces between the internal wall 18 and cartridge 10. Respectively interconnecting adjacent pairs of support surfaces 16 are planar nonsupport surfaces 22 spaced from internal wall 18 of bore 12 defining a space 23. The nonsupport surfaces 22 are parallel to center axis 20 and lie in planes intersecting one another at angles of 60°.

Cartridge 10 also has a cylindrical bearing cavity or opening 24 extending therethrough from an outer side 26 to an inner side 28. Three pivoted bearing pads 30 are contained therewithin in bearing relationship with the journal 32 of a rotatable shaft. When properly adjusted, a selected small diametral clearance exists between journal 32 and bearing pads 30 to allow the flow of lubricant therebetween.

Each of the three bearing pads 30 is carried at the inner end of an associated one of three elongate externally threaded members or screws 34 by means of a pivot ball 36. The three screws 34 extend through and are in threadable engagement with a respective one of three radially extending screw holes 38. The three screw holes 38 extend through the body of cartridge 10 from the three nonsupport surfaces 22, respectively, to the central bearing cavity 24. In accordance with the invention, each of screws 34 has a head 40 or other suitable part accessible by means of a wrench or the like inserted into the bore from the open end thereof in an axial direction through the space 23. By rotating screw 34, the position of the bearing pad 30 carried thereby relative to cartridge 10, and thus to journal 32, is adjusted.

The insertable bearing assembly includes a locking or tightening mechanism for removing thread clearance between each screw 34 and screw hole 38 after desired positional adjustment has been made thereto. This tightening mechanism includes an arcuate slot 44 extending across the nonsupport surface 22 and partially into the adjacent support surfaces 16 at opposite ends thereof that intersects screw hole 38 along its length. Arcuate slot 44 is substantially normal to center axis 20 and divides a portion of the cartridge body including nonsupport surface 22 into two spaced walls 46 and 48. With arcuate slot 44 extending lengthwise through screw hole 38, screw hole 38 is defined by a pair of complementary, internally threaded sectional cylindrical grooves 50 and 52 respectively located in outer wall 48 and inner wall 46, as best seen in FIG. 4. Grooves 50 and 52 are of course located directly opposite, and face each other. The elongate threaded member or screw 34 is threadably engaged with the internal thread of screw hole 38 in the same fashion as if slot 44 were absent, with the exception that there is no threadable engagement of that portion of the screw 34 located along slot 44.

Located on opposite sides of screw hole 38 are a pair of tapped holes 54 which extend though outer wall 48 and into inner wall 46. Tapped holes 54 are substantially parallel to center axis 20 and thus normal to the elongate axis of the screw hole 38. Each of tapped holes 54 threadably receives the shank of a tightening cap screw 56. The shank extends through a clearance hole in wall 48 and into, and in threadable engagement with, inner wall 46. The screw shank extends through a lock washer or other like resilient member 60. The lock washer 60 is sandwiched between hexagonal screw head 58 at the end of the shank and the outer side 26 of the cartridge when the screw is tightened. Tightening of screws 58 reduces the spacing between inner wall 48 and outer wall 46 adjacent the screws, and thereby decreases the effective diameter of screw hole 38. The thread clearance between screw hole 38 and screw 34 is thereby reduced, and backlash is eliminated to the extent of this reduction.

A pair of transverse slots 62 located on opposite sides of screw hole 38 are provided to increase the flexibility of spaced walls 48 and 46 and isolate the support surfaces 16 from the action of screws 56. The slots 62 intersect arcuate slot 44 and extend through both inner wall 46 and outer wall 48. Slots 62 are normal to nonsupport surface 22 and extend therefrom into the body of cartridge 10 to the bottom of arcuate slot 44. The portions of spaced walls 46 and 48 between transverse slots 62 are thereby resiliently and flexibly connected to the body of cartridge 10 adjacent the bottom of arcuate slot 44 in cantilever fashion. The two tapped holes 54 are respectively located between the pair of transverse slots 62 and screw holes 38.

The insertable bearing assembly is a fluid film bearing. Cooling lubricant fluid from a source within the machine of machine housing 14 flows though an entry port 64 in machine housing 14 and through a radial passageway 66 of bearing cartridge 10. Fluid passageway 66 extends in a radial direction from bearing cavity 24 to one of the outer support surfaces 16 and into communication with fluid entry port 64. The lubricating fluid enters into bearing cavity 24 from entry port 64, as indicated by arrows 68. A film of the fluid lubricant is thus provided in the pivot circle clearance space between bearing pad 30 and journal 32.

Turning now to FIG. 4, the lubricant is seen to be temporarily retained in bearing cavity 24 by means of an inner seal disk 70 and a pair of outer seal disks 72. The peripheral edge of inner seal 70 overlies an annular groove in side 28 of cartridge 10 surrounding bearing cavity 24 and is held in place by means including an inner bearing retainer 74. The outer seals 72 are held in place by a pair of O-ring spacers 76 located on opposite sides of one of the seals 72 and overlying the other one of the seals 72. The seals 72 together with the O-ring spacers 76 are retained within an annular slot 78 formed by a pair of complementary annular grooves respectively located in the wall of bearing cavity 24 adjacent the respective openings thereof and in the inner wall 79 of an outer bearing retainer 98.

The inner seal 70 has an outlet port 80 through which lubricant retained within bearing cavity 24 flows back to an oil sump (not shown) of the machine in the manner indicated by arrows 82. Some lubricant flow also occurs between the journal 32 and bearing pad 30. Lubricating fluid is also allowed to pass through an oil drain passageway 84, and a slot 86 in the inner O-ring 76, as indicated by arrows 88. This flow in the bearing cavity of cooled lubricant maintains a suitable operating temperature for the three pivoted bearing pads 30.

The bearing cartridge 10 is retained against lateral movement within bore 12 by means including a retaining ring 90 and the outer bearing retainer 98. The retaining ring 90 extends radially into an annular groove 92 in bore 12 adjacent the inner opening thereof. A pin 94 extending through aligned axial holes respectively located in cartridge 10 and inner bearing retainer 74 is provided to radially locate cartridge 10 and inner bearing retainer 74. The outer bearing retainer 98 is releasably held in position by means of screws 100 inserted through screw holes located at a peripheral edge 102 thereof overlying the outer surface of machine housing wall 14. A cylindrical collar portion 104 of outer retainer 98 extends into he outer opening of bore 12 and presses against the outer side 26 of cartridge 10 squeezing it and inner retainer 74 together against inner retaining ring 90. Also, the O-ring spacer 76 and outer seal disks 72 are pressed together and against the axially facing wall of the annular groove in side 26 of cartridge 12 that partially defines slot 78.

It should be appreciated that the advantages of the present invention may be obtained with configuration of the bearing assembly differing from that identically disclosed. For instance, if the cavity in the machine housing were non-cylindrical, the cartridge could be cylindrical. The basic consideration is that the shape of the cartridge relative to the cavity is such that nonsupport surfaces 22 are provided. Preferably, nonsupport surfaces 22 are planar, but the advantages of the invention could be enjoyed with nonplanar nonsupport surfaces. Further, it should be understood that the space provided between the nonsupport surfaces and the bore could be employed for access to adjustment mechanisms other than that disclosed. For example, the spring adjustment mechanism respectively disclosed in the two aforementioned U.s. patents could be employed iwt te cartridge 10 of the insertable bearing assembly. Moreover, while the coupling arrangement for removing thread clearance between screws 34 and screw holes 38 is particularly adapted for use in the disclosed pivot pad bearing assembly, it could be successfully employed in other applications.

I claim:
1. A bearing assembly for supporting a rotatable shaft at a location within a cavity defined by an internal wall, comprising:
 a cartridge insertable into the cavity with a support surface in supportable contact with the internal wall and a nonsupport surface spaced from said internal wall;
 means for bearing the shaft; and
 means for adjustably securing said bearing means to the cartridge including means accessible through the space between the nonsupport surface and said internal wall for manual adjustment thereof.

2. The bearing assembly of claim 1 wherein manual adjustment of said securing means is effective to change the position of the bearing means relative to the cartridge.

3. The bearing assembly of claim 2 in which said adjustable securing means includes a securing member carrying the bearing means at one end thereof and means for threadably connecting the securing member to the cartridge, and said accessible means includes a part of said securing means accessible through said space, manual rotation of said part causing the securing member and the bearing means carried thereby to move relative to the cartridge.

4. The bearing assembly of claim 3 wherein said cartridge has a shaft-receiving hole with a face opening in the elongate direction of the rotatable shaft and said shaft bearing means is carried by said securing member and bears said shaft within said shaft-receiving hole.

5. The bearing assembly of claim 4 in which said cartridge has an internally threaded hole extending therethrough from said nonsupport surface to the shaft-receiving hole and said securing member is threadably received therein and extends from adjacent said nonsupport surface to the shaft-receiving hole, the accessible part thereof being adjacent the nonsupport surface.

6. The bearing assembly of claim 5 in which said securing member is a screw having a screw head, said screw head being said accessible part and being located between the nonsupport surface and the internal wall of the cavity.

7. The bearing assembly of claim 5 in which said cartridge has a plurality of said outer support surfaces in supportable contact with the internal wall and a plurality of said nonsupport surfaces respectively located between the plurality of support surfaces, and said bearing means comprises a plurality of said bearing members, each connected to the cartridge in a substantially identical fashion as said one securing member, each of said bearing members having a part accessible for adjustment through the space between a respective one of said plurality of nonsupport surfaces and said internal wall.

8. The bearing assembly of claim 1 in which said cartridge has a plurality of outer support surfaces in supportable contact with the internal wall of the cavity when inserted therein and a plurality of nonsupport surfaces respectively located between adjacent pairs of the plurality of support surfaces and spaced inwardly from said internal wall, and said adjustable securing means includes a plurality of securing members each having a part thereof accessible through the space between a respective one of the nonsupport surfaces and the internal wall for manual adjustment thereof.

9. The bearing assembly of claim 1 wherein said cavity is a cylindrical bore and said outer support surface of the cartridge is a portion of a cylindrical surface congruent with that of the bore.

10. The bearing assembly of claim 1 in which said nonsupport surface is substantially planar, and said adjustable support means includes a screw having a screw head, said screw being threaded into the cartridge in a direction normal to the plane of the nonsupport surface with said screw head being accessible through said space.

11. The bearing assembly of claim 1 in which said cartride has a bearing opening within which said bearing means is located, said cavity has a lubricant fluid entry port opening into the internal wall thereof, and said cartridge includes a passageway extending between said bearing opening and said support surface, said lubricant fluid passageway communicating with the fluid entry port in the wall of the cavity when the cartridge is inserted therein for conveying lubricating fluid from the fluid entry port to the bearing opening.

12. The bearing assembly of claim 1 in which said securing means includes an elongate externally threaded securing member threadably connected with and extending through a portion of the cartridge, said member having a part accessible through said space for rotating the member to adjustably position it relative to the cartridge.

13. The bearing assembly of claim 12 in which said elongate member is threadably received within an internally threaded hole extending through a portion of the cartridge, and said securing means includes means axially accessible through the cavity opening for tightening the threaded connection between the elongate member and the threaded hole, said tightening means including means manually operable to reduce any existing thread clearance between the securing member and the internally threaded hole.

14. The bearing assembly of claim 13 in which said internally threaded hole is defined by complementary sectional cylindrical grooves located in spaced walls of said cartridge and said manually operable means includes means engageable with both said walls for flexibly reducing the space therebetween adjacent said threaded grooves, thereby squeezing the internal threads of the grooves against the external threads of the securing member secured therebetween.

15. The bearing assembly of claim 14 in which said means engageable with both said walls includes a screw extending through a clearance hole in one of said walls and into the other of said walls where threadable engagement provides means of clamping said walls against the ball pivot screws.

16. The bearing assembly of claim 15 in which said walls are spaced from one another on opposite sides of said grooves and said tightening means includes means engageable with both said walls at opposite sides of said complementary grooves for reducing the spacing between the walls on both sides thereof.

17. The bearing assembly of claim 16 in which at least one of said walls includes a slot transverse thereto to increase the flexibility thereof.

18. The bearing assembly of claim 17 in which said one wall has another slot transverse thereto, said grooves being located between the one and the other transverse slots.

19. A coupling apparatus comprising:
a body having a slot therein defining two spaced walls;
a pair of complementary internally threaded sectional cylindrical grooves respectively located in said two spaced walls directly opposite and facing one another;
an elongate externally threaded member coupled to said body, said elongate member extending between said grooves and in threadable engagement therewith; and
a tightening member engageable with both said walls for reducing the spacing therebetween and thereby reducing the thread clearance between the member and the grooves.

20. The coupling apparatus of claim 19 in which at least one of said walls has a slot transverse thereto for increasing the flexibility thereof relative to the body.

21. The coupling apparatus of claim 19 in which said tightening member comprises an elongate threaded member extending transversely through one of said walls and in threadable engagement with the other of said walls.

* * * * *